United States Patent [19]

de Saint-Michel

[11] 4,258,773

[45] Mar. 31, 1981

[54] TIRE FOR AIRPLANE WHEELS

[75] Inventor: Michel R. de Saint-Michel, Clermont-Ferrand, France

[73] Assignee: Compagnie Generale des Etablissements Michelin, Clermont-Ferrand, France

[21] Appl. No.: 79,959

[22] Filed: Sep. 28, 1979

[30] Foreign Application Priority Data

Oct. 5, 1978 [FR] France .................................. 78 30534

[51] Int. Cl.³ .......................... B60C 9/08; B60C 9/20
[52] U.S. Cl. ............................. 152/352 R; 152/354 R; 152/359; 152/361 R; 152/374; 152/330 R
[58] Field of Search ............ 152/330 R, 352 R, 352 A, 152/353 R, 353 C, 353 G, 354 R, 354 RB, 355, 356, 357 R, 357 A, 359, 361 R, 361 FP, 361 DM

[56] References Cited

U.S. PATENT DOCUMENTS

| | | | |
|---|---|---|---|
| 3,090,189 | 5/1963 | Boussu et al. | 57/236 |
| 3,090,190 | 5/1963 | Boussu et al. | 57/236 |
| 3,195,602 | 7/1965 | Keefe | 152/354 |
| 3,682,222 | 8/1972 | Alderfer | 152/361 R |
| 4,047,552 | 9/1977 | Maeda et al. | 152/361 R |

Primary Examiner—John T. Goolkasian
Assistant Examiner—Lois E. Boland
Attorney, Agent, or Firm—Brumbaugh, Graves, Donohue & Raymond

[57] ABSTRACT

A tire for airplane wheels of the radial carcass type comprises a stretchable crown reinforcement composed of five plies of cables having relative elongations upon rupture of between 10% and 40%. The radial carcass is, under molding pressure, further away from the equatorial plane than at the operating pressure. At the test pressure, the radial carcass is even less far away from the equatorial plane.

4 Claims, 1 Drawing Figure

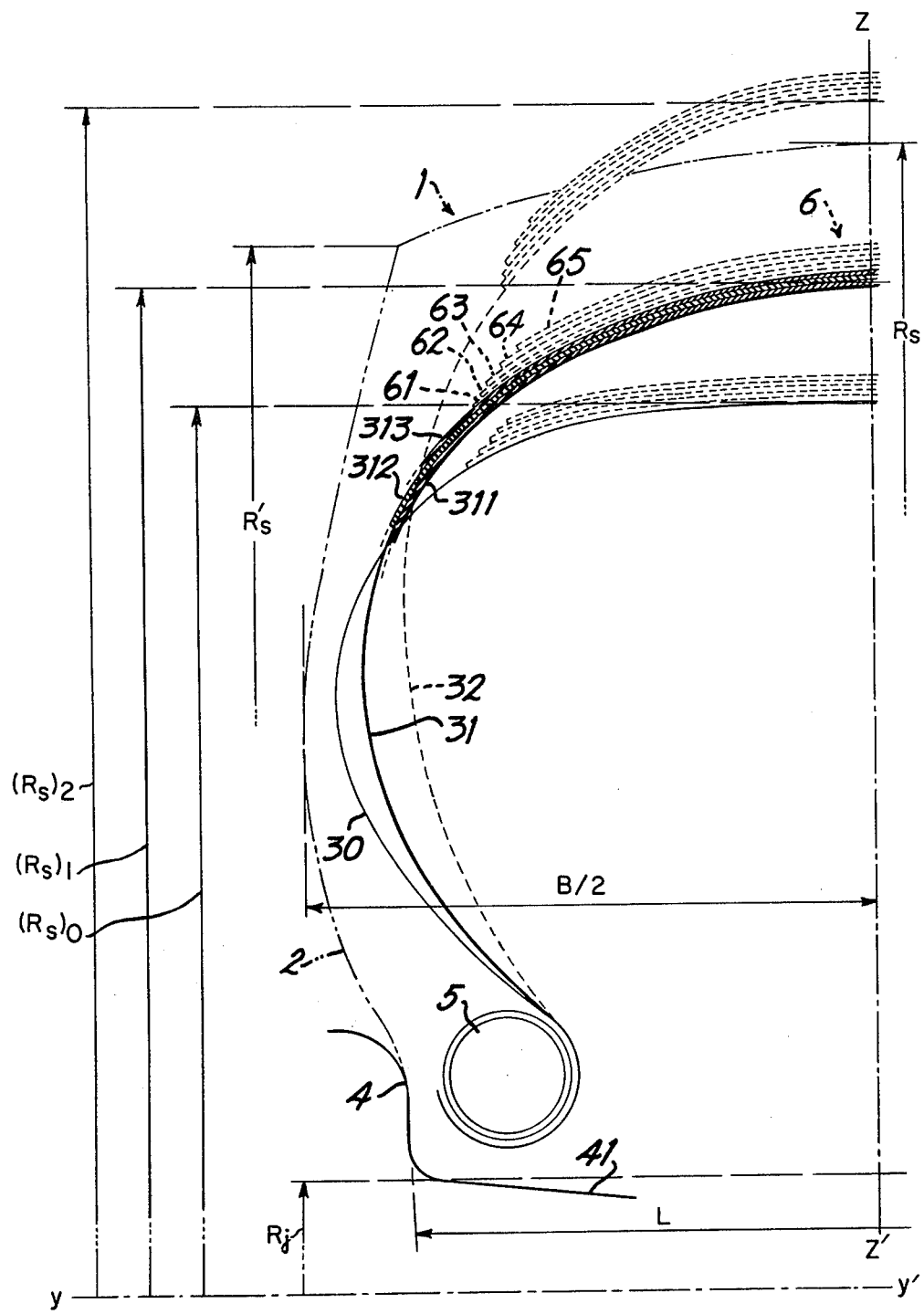

TIRE FOR AIRPLANE WHEELS

The present invention relates to tires which, according to the customary standards or regulations, must resist a pressure, known as the test pressure, without damage. This test pressure is equal to a multiple of the cold inflation pressure, known as an operating pressure, stipulated in the same standards or regulations. Furthermore, the same tires when not under load must have at their operating pressure overall dimensions (maximum axial width, exterior diameters at the equator and/or at the shoulders) which are also defined by the standards or regulations.

One type of tire which is standardized or regulated in this manner is an airplane tire. In the case of airplane tires the test pressure is equal to four times the operating pressure. More particularly, the invention relates to tires of standardized size and test pressure which have a carcass reinforcement with radial reinforcement elements anchored to at least one bead ring in each bead and surrounded by a crown reinforcement formed of at least one ply of parallel reinforcement elements.

In a tire having a radial carcass reinforcement, but without a crown reinforcement, it is known that the radial carcass reinforcement assumes as equilibrium meridian profile known as its natural equilibrium meridian profile under the effect of the inflation pressure.

This natural equilibrium meridian profile is defined by the equation:

$$\cos \phi = (R^2 - R_e^2)/(R_s^2 - R_e^2)$$

$\phi$ is the angle formed by the straight line tangent to the equilibrium meridian profile and the axis of rotation of the tire at a point of said profile of radius R with reference to the axis of rotation of the tire. $R_e$ is the radius of the point where the equilibrium meridian profile reaches the maximum axial distance from the equatorial plane and has a tangent parallel to the equatorial plane of the tire. This equatorial plane is perpendicular to the axis of rotation of the tire and is a plane of symmetry of the equilibrium meridian profile. $R_s$ is the radius of the point of the equilibrium meridian profile furthest from the axis of rotation of the tire. This point is formed by the intersection of the equilibrium meridian profile with the trace of the equatorial plane on the meridian or radial plane containing the equilibrium profile.

The above equation shows that the natural equilibrium meridian profile assumed by the radial carcass reinforcement by itself is independent of the inflation pressure if one disregards the stretchability of the radial reinforcement elements.

The crown reinforcement, on the one hand, imparts certain properties of use to a tire provided with a radial carcass reinforcement. In tires of the type in question, the crown reinforcement encircles the radial carcass reinforcement in order to impart to the radial carcass reinforcement and thus to the tire, when the inflation pressure is equal to the operating pressure, overall dimensions (diameters at the equator and at the shoulders, maximum axial width) which are in accord with the standards or regulations.

When such a tire is inflated, the radial carcass reinforcement tends to assume its natural equilibrium meridian profile. This results in an expansion of the radial carcass reinforcement which subjects the crown reinforcement to a circumferential tension which increases with the inflation pressure. As a matter of fact, this circumferential tension T in first approximation satisfies the equation $$T = (D \cdot P)/2$$

per unit of length (in the axial direction) of the crown reinforcement. In this equation, D is the diameter of the crown reinforcement at the equator and P the inflation pressure of the tire.

Now the test pressure is a multiple of the operating pressure. Thus the crown reinforcement is subjected to a circumferential test tension which is a multiple (for instance, 4 times in the case of airplane tires) of the circumferential operating tension. The adoption for the calculation of the resistance to the test pressure of the crown reinforcement (product of the test pressure by the selected coefficient of safety), of an ordinary coefficient of safety, leads to a crown reinforcement formed of an excessive number of reinforcement elements and/or plies, even when using reinforcement elements of materials having the highest modulus of elasticity. In particular, the excessive radial thickness and/or stiffness to flexure of such a crown reinforcement impair the behavior and/or the life of such a tire.

The object of the present invention is the design of a tire of the type in question which satisfies the requirements of the standards of regulations while avoiding hypertrophy of the crown reinforcement, as well as the above-indicated drawbacks which result therefrom.

Accordingly, the invention provides for endowing the tire of the type in question with an elastic crown reinforcement which is circumferentially stretchable such that, the tire being mounted on a standard rim and without load, (a) when the inflation pressure is close to 10% of the operating pressure of the tire, the diameters of the tire at the equator and at the shoulders are less than the corresponding diameters imposed under an inflation pressure equal to the operating pressure, and the maximum axial width of the tire is greater than the corresponding width imposed under an inflation pressure equal to the operating pressure, and (b) when the inflation pressure is equal to the test pressure, the elongation of the crown reinforcement in the circumferential direction of the tire with respect to the length thereof when the inflation pressure is close to 10% of the operating pressure is such that the carcass reinforcement approximately reaches its natural equilibrium meridian profile.

A preferred variant of the invention consists in providing the tire of the type in question with a carcass reinforcement whose radial reinforcement elements, under an inflation pressure equal to the test pressure, are of little stretchability. This facilitates the calculation of the natural equilibrium meridian profile of the carcass reinforcement. However, it is also possible to calculate this natural equilibrium meridian profile by taking into account the stretchability of the radial reinforcement elements of the carcass reinforcement. Radial reinforcement elements of the carcass reinforcement with relative elongations, under a tension corresponding to the operating pressure of the tire, which are less than 5% as compared with a zero tension, can be considered, within the scope of the invention, as nonstretchable reinforcement elements. This is true in particular when the reinforcement elements are cables of steel wires having relative elongations upon rupture of less than 2.5%.

Preferably also, when the inflation pressure is close to 10% of the operating pressure, the diameters of the tire at the equator and at the shoulders are at least 5% less than the same diameters measured under an inflation pressure equal to the operating pressure of the tire. In this way, the distribution of the increases in the diameter at the operating and test pressures is improved.

By circumferential elongation of the crown reinforcement there is understood, by convention within the scope of the present invention, the variation of the developed length of the elastic crown reinforcement resulting from the inflation of the tire from a pressure close to 10% of the operating pressure to a pressure greater than the first, this variation being evaluated along an imaginary equatorial circle arranged on the radially inner face of the crown reinforcement of the tire mounted on a standard rim but not under load.

The circumferential elongation of the crown reinforcement in accordance with the invention under an inflation pressure equal to the test pressure is such that the radial carcass reinforcement is approximately at its natural equilibrium meridian profile and that in particular the equatorial radius corresponds approximately to the equatorial radius $R_s$ of the natural equilibrium meridian profile. Thus, due to the preferably limited stretchability of the reinforcement elements of the radial carcass reinforcement, the carcass reinforcement absorbs practically all the stresses coming from the inflation of the tire at the test pressure. It results from this that the circumferential tension of the crown reinforcement remains approximately limited to that corresponding to the total expansion of the carcass reinforcement under the effect of the test pressure. Hence the advantage of being able to reduce the resistance of the crown reinforcement and in particular decrease the price and the weight thereof. Furthermore, the limited stretchability of the carcass reinforcement and the reduction of its reinforcement favors the expansion of the carcass reinforcement towards its natural equilibrium meridian profile. At the natural equilibrium meridian profile the tension of a radial reinforcement element, for instance a wire or a cable of the carcass reinforcement, corresponds to the equation $$t = \frac{\pi \cdot P (R_s^2 - R_e^2)}{n}$$

In this equation, P is the inflation pressure, $R_s$ and $R_e$ are the radii previously defined, n is the number of reinforcement elements counted along a parallel line, i.e. perpendicular to the radial direction, and $\pi = 3.14$.

Use of a stretchable (in the green state) crown reinforcement in combination with a radial carcass reinforcement is known. Such a crown reinforcement is used, for instance, in certain tire building processes. In these processes, the crown reinforcement is placed on the radial carcass reinforcement when the latter is in the state of a raw cylindrical blank. Then the assembly thus constituted, either before introduction into the vulcanization mold or within the latter, is shaped to the toroidal shape. The stretchability of the crown reinforcement is obtained by using stretchable reinforcement elements or by using undulated crown plies or elements, the undulations of which disappear under the effect of the elongation caused by the expansion to the toroidal shape. The malleability of the rubber in nonvulcanized state facilitates the stretchability of the crown reinforcement.

The stretchability of the crown reinforcement in accordance with the invention, on the other hand, is understood to be in the vulcanized condition of the tire. It employs the fundamental elasticity of the crown reinforcement, that is to say the automatic return thereof to its circumferential length at the operating pressure when the pressure is reduced from the test pressure to the operating pressure and then to its initial circumferential length under 0.1 times the operating pressure, subject to the hysteresis of the materials used to manufacture the reinforcement elements. The variation in the circumferential elongation of the crown reinforcement is a function of the overall dimensions imposed by the standards or regulations. On basis of these exterior dimensions (provided furthermore with tolerance figures) which are to be respected when the tire is inflated to its operating pressure and the dimensions (width and diameter) of the corresponding rim, the meridian trace of the radial carcass reinforcement is defined, that is to say the developed length of the carcass reinforcement. This developed length intervenes in the variation of circumferential elongation of the crown reinforcement under the action of the test pressure.

The means for satisfying this stretchability are numerous. As example, the following may be used individually or in combination.

One can use reinforcement elements, on the one hand, in the form of cables of elastic textile materials. These cables have relative elongations at rupture of between 10% and 40%. Thus, with the customary cabling torsions, polyamide cables have relative elongations upon rupture which may reach up to about 40% while those of polyester may reach up to about 20%.

On the other hand, metal materials of high modulus of elasticity, such as steel, permit the manufacture of reinforcement elements in the form of so-called elastic cables in accordance with U.S. Pat. Nos. 3,090,189 and 3,090,190. The elastic steel cables have a relative elongation upon rupture of at least 6%.

The elasticity of the reinforcement elements of one or more crown plies are preferably employed when the crown plies form zero or low angles, but less than 20° with the circumferential direction of the tire.

However, one can also use less elastic reinforcement elements or ordinary reinforcement elements in combination with plies forming angles of more than 20° with the circumferential direction of the tire. The elasticity of the vulcanized elastomer mixes which surround the reinforcement elements of the plies then permit suitable variations in length of the crown reinforcement. If necessary, one can use elastomer mixtures for the covering of the reinforcement elements whose moduli of elasticity in vulcanized condition are less than the moduli of elasticity of the customary mixes (250 to 850 daN/cm² measured at 100% elongation).

The drawing and the description thereof given below illustrate one embodiment of the present invention.

The example selected is that of an airplane tire of standard dimensions of 30×8.8-15 (in inches) or 762×223-381 (in mm) of series VII (T.R.A. [Tire and Rim Association] standards), mounted on a rim of sizes of 7×15 (in inches) or 178×381 (in mm).

The sole FIGURE of the drawing shows on a reduced scale the left half of a schematic radial section of such a tire 1, the right half (not shown) being symmetrical with respect to the trace ZZ' of the equatorial plane on the plane of the drawing, which plane of the drawing also contains the axis of rotation YY' of the tire 1.

The exterior size imposed at the operating pressure (maximum axial half width B/2, radii $R'_s$ at the shoulder and $R_s$ at the equator) is indicated by a dot-dash line 2.

The FIGURE shows, in a meridian plane, the profile of the radial carcass reinforcement both under 10% of the operating pressure (30), under the operating pressure (31) and under the test pressure (32). The profile 32 is substantially the natural equilibrium meridian profile of the carcass reinforcement.

The maximum operating pressure of a tire of the dimensions indicated is close to 15.5 bars. The test pressure is therefore close to 62 bars for a tire corresponding to a "ply rating" of 18.

The tire 1 is mounted on a rim 4 whose radius $R_j$ at the bead seat 41 is equal to 190.5 mm and whose width L is equal to 178 mm, these dimensions being defined in accordance with the customary standards.

The radial carcass reinforcement (30, 31, 32) is formed of three plies of polyamide cables of 1880×6 (relative elongation at rupture 22% under about 80 daN). Only a portion of the three plies 311, 312, 313 has been shown in the position 31 occupied by the radial carcass reinforcement under the operating pressure.

The number of reinforcement elements of a ply of the radial carcass reinforcement per centimeter is equal to 8 at the level of the bead ring 5.

The crown reinforcement 6 is formed in accordance with the invention of five plies 61, 62, 63, 64, 65 of polyamide cables (titer 1880×4, 7.5 cables per cm) parallel to the circumferential direction of the tire. The relative elongation of these cables at 10% of their rupture load is equal to about 2.8% for an elongation at rupture equal to 21%, and the modulus of elasticity of the elastomer mix covering the cables is equal to about 450 daN/cm² at 100% elongation.

At 10% of the operating pressure, the equatorial radius $(R_s)_0$ of the radial carcass reinforcement 30 is equal to 337 mm. At the operating pressure, this equatorial radius $(R_s)_1$ of the radial carcass reinforcement 31 is equal to 361 mm. At the test pressure this equatorial radius $(R_s)_2$ of the radial carcass reinforcement 32 reaches 396 mm. At the level of the radial carcass reinforcement 32, the crown reinforcement 6 in accordance with the invention has therefore suffered an elongation equal to 371 mm under the effect of the test pressure, namely a relative elongation of $$\frac{371}{2\pi \cdot 337} \times 100\% = 17.5\%$$

Conversely, the maximum axial half width B/2 of the radial carcass reinforcement 30, 31, 32 and, therefore, of the tire 1 has decreased. At 10% of the operating pressure it is equal to 102 mm, at the operating pressure of 97 mm and at the test pressure to 89 mm. This decrease of the axial width when the inflation pressure is increased is a property of the tires in accordance with the invention.

The tension of a reinforcement element of the radial carcass reinforcement 32 under the effect of the test pressure is about 42 daN (relative elongation 13%). Such an element breaks under a tension of 80 daN. At the operating pressure, the tension of a reinforcement element is less than or equal to 10.5 daN (relative elongation 3.8%) due to the influence of the crown reinforcement in accordance with the invention.

For comparison, a tire of the same size as the above, but provided with a conventional carcass and crown reinforcement, would require for the latter seven plies instead of five, i.e. 40% more. For tires of greater sizes, this hypertrophy would reach still greater proportions since circumferential tension is, as explained above, related to the equatorial diameter of the crown reinforcement.

What is claimed is:

1. A vulcanized airplane tire of imposed size under an inflation pressure equal to the operating pressure and capable of withstanding a test pressure which is a four-fold multiple of the operating pressure, characterized by the fact that it comprises:

(a) a carcass reinforcement having substantially non-stretchable radial reinforcing elements which, under a tension corresponding to the operating pressure of the tire, have relative elongations that are less than 5% as compared with a zero tension, the carcass reinforcement being anchored to at least one bead ring in each bead; and (b) radially outward of the carcass reinforcement, a crown reinforcement which is elastic and stretchable in the circumferential direction of the tire and which is formed of at least one ply of parallel elastic textile reinforcing cables having relative elongations upon rupture of between 10% and 40%, the angles which the parallel textile reinforcing cables of the crown reinforcement form with the circumferential direction of the tire being between 0° and 20°;

the crown reinforcement being such that, the tire being mounted on a standard rim and without load, (b₁) when the inflation pressure is close to 10% of the operating pressure of the tire, the diameters of the tire at the equator and at the shoulders are at least 5% less than the corresponding diameters measured under an inflation pressure equal to the operating pressure, and the maximum axial width of the tire is greater than the corresponding width measured under an inflation pressure equal to the operating pressure, and (b₂) when the inflation pressure is equal to the test pressure, the elongation of the crown reinforcement in the circumferential direction of the tire with respect to the length thereof when the inflation pressure is close to 10% of the operating pressure is such that the carcass reinforcement approximately reaches its natural equilibrium meridian profile.

2. A vulcanized airplane tire of imposed size under an inflation pressure equal to the operating pressure and capable of withstanding a test pressure which is a four-fold multiple of the operating pressure, characterized by the fact that it comprises:

(a) a carcass reinforcement having substantially non-stretchable radial reinforcing elements which, under a tension corresponding to the operating pressure of the tire, have relative elongations that are less than 5% as compared with a zero tension, the carcass reinforcement being anchored to at least one bead ring in each bead; and (b) radially outward of the carcass reinforcement, a crown reinforcement which is elastic and stretchable in the circumferential direction of the tire and which is formed of at least one ply of parallel elastic steel reinforcing cables having a relative elongation upon rupture of at least 6%, the angles which the parallel elastic steel reinforcing cables of the crown reinforcement form with the circumferential direction of the tire being greater than 20°;

the crown reinforcement being such that, the tire being mounted on a standard rim and without load, (b$_1$) when the inflation pressure is close to 10% of the operating pressure of the tire, the diameters of the tire at the equator and at the shoulders are at least 5% less than the corresponding diameters measured under an inflation pressure equal to the operating pressure, and the maximum axial width of the tire is greater than the corresponding width measured under an inflation pressure equal to the operating pressure, and (b$_2$) when the inflation pressure is equal to the test pressure, the elongation of the crown reinforcement in the circumferential direction of the tire with respect to the length thereof when the inflation pressure is close to 10% of the operating pressure is such that the carcass reinforcement approximately reaches its natural equilibrium meridian profile.

3. The tire according to claim 1 or 2, characterized by the fact that the substantially nonstretchable radial reinforcing elements of the carcass reinforcement are cables of steel wires having relative elongations upon rupture of less than 2.5%.

4. The tire according to claim 2, characterized by the fact that the crown plies have their elastic steel reinforcing elements embedded in an elastomer mix having a modulus of elasticity less than 250 daN/cm$^2$ measured at 100% elongation.

* * * * *